United States Patent
Denavit et al.

(10) Patent No.: US 10,773,479 B2
(45) Date of Patent: Sep. 15, 2020

(54) SYSTEM FOR PLACEMENT OF FOAM RING ONTO AN INTERIOR TIRE SURFACE

(71) Applicants: Compagnie Generale des Etablissements Michelin, Clermont-Ferrand (FR); Michelin Recherche et Technique S.A., Granges-Paccot (CH)

(72) Inventors: Franck Denavit, Clermont-Ferrand (FR); Stéphane Ravat, Clermont-Ferrand (FR); Florent Monbrun, Clermont-Ferrand (FR)

(73) Assignee: COMPAGNIE GENERAL DES ETABLISSEMENTS MICHELIN, Clermont-Ferrand (FR)

( * ) Notice: Subject to any disclaimer, the term of this patent is extended or adjusted under 35 U.S.C. 154(b) by 782 days.

(21) Appl. No.: 15/321,796

(22) PCT Filed: Jun. 30, 2015

(86) PCT No.: PCT/EP2015/064902
§ 371 (c)(1),
(2) Date: Dec. 23, 2016

(87) PCT Pub. No.: WO2016/001259
PCT Pub. Date: Jan. 7, 2016

(65) Prior Publication Data
US 2017/0144394 A1 May 25, 2017

(30) Foreign Application Priority Data
Jul. 4, 2014 (EP) .................................. 14306101

(51) Int. Cl.
*B29D 30/06* (2006.01)
*B60C 19/00* (2006.01)
(Continued)

(52) U.S. Cl.
CPC ..... *B29D 30/0681* (2013.01); *B29D 30/0061* (2013.01); *B60C 19/002* (2013.01);
(Continued)

(58) Field of Classification Search
CPC B29D 30/0061; B29D 30/04; B29D 30/0645; B29D 30/0681; B29D 30/2607;
(Continued)

(56) References Cited

U.S. PATENT DOCUMENTS 1,759,681 A 5/1930 Bines
1,944,767 A * 1/1934 Stevens .............. B29D 30/0645
264/315
(Continued)

FOREIGN PATENT DOCUMENTS

EP 1688240 8/2006
EP 1852281 11/2007
(Continued)

OTHER PUBLICATIONS

International Search Report for PCT/EP2015/064902 dated Sep. 4, 2015.
Extended European Search Report for application No. 1430601.8.

Primary Examiner — Geoffrey L Knable
(74) Attorney, Agent, or Firm — Dority & Manning, P.A.

(57) ABSTRACT

A system is provided for placement of noise attenuating foam along an inside surface of a tire to attenuate cavity noise. The system can be used with tires of various sizes and shapes such that different foam sizes may be utilized. The system provides for automating the process of foam placement in a manner that allows for consistent placement of the foam during e.g., tire manufacture.

9 Claims, 16 Drawing Sheets

(51) Int. Cl.
*B29D 30/00* (2006.01)
*B60C 25/05* (2006.01)
*B29K 105/04* (2006.01)

(52) U.S. Cl.
CPC .. *B60C 25/0509* (2013.01); *B29D 2030/0038* (2013.01); *B29K 2105/04* (2013.01)

(58) Field of Classification Search
CPC .... B29D 2030/0038; B29D 2030/0083; B60C 19/002; B60C 25/0509
See application file for complete search history.

(56) References Cited

U.S. PATENT DOCUMENTS

| | | | | |
|---|---|---|---|---|
| 1,946,787 | A * | 2/1934 | Feinberg | B60C 25/142 301/12.2 |
| 2,171,424 | A * | 8/1939 | Breth | B29D 30/36 425/48 |
| 2,416,523 | A * | 2/1947 | Haren | B29D 30/242 156/418 |
| 3,380,115 | A * | 4/1968 | Soderquist | B29D 30/0603 425/38 |
| 8,939,486 | B2 * | 1/2015 | Gorham | B25J 15/10 294/93 |
| 2007/0170620 | A1 * | 7/2007 | Yoshino | B29D 30/0662 264/326 |
| 2014/0116601 | A1 * | 5/2014 | Bormann | B60C 19/002 156/117 |

FOREIGN PATENT DOCUMENTS

| | | |
|---|---|---|
| EP | 2727713 | 5/2014 |
| JP | 55081139 | 6/1980 |
| JP | 2001171849 | 6/2001 |
| JP | 2005333827 | 12/2005 |
| JP | 2008254338 | 10/2008 |

* cited by examiner

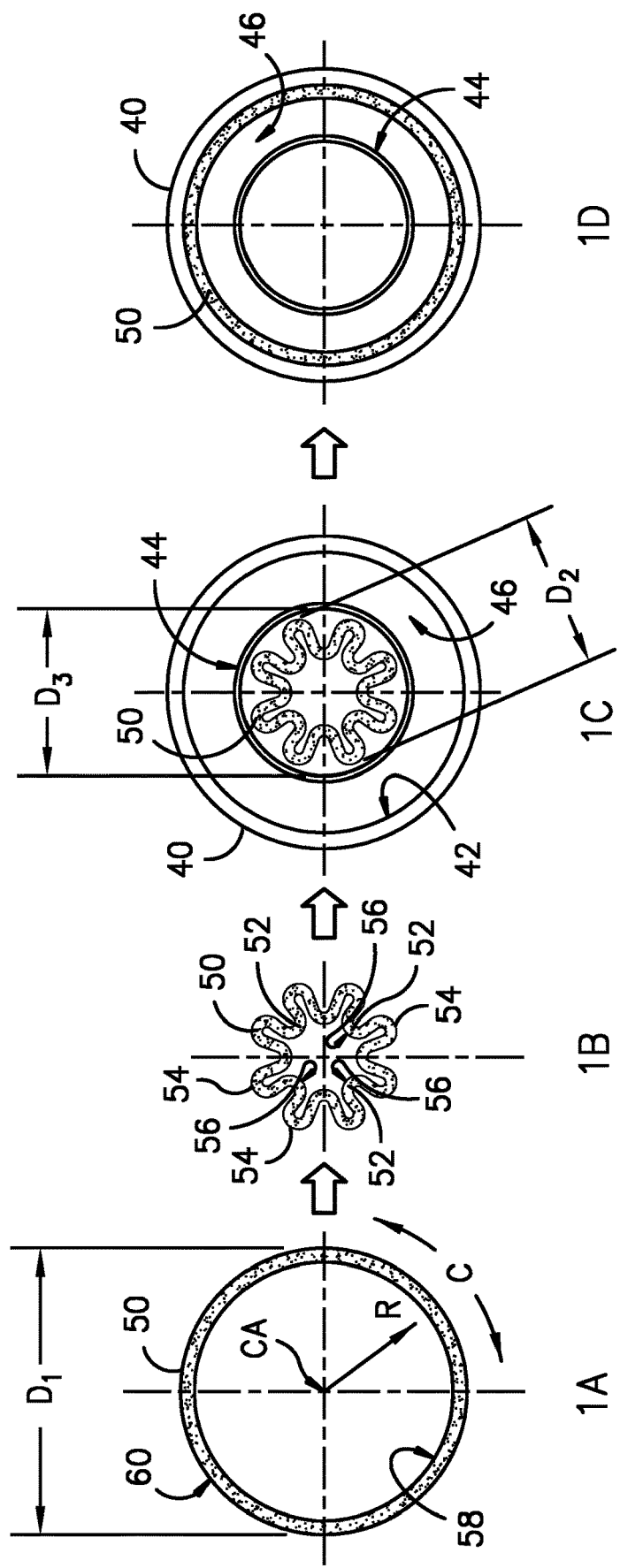
FIG. -1-

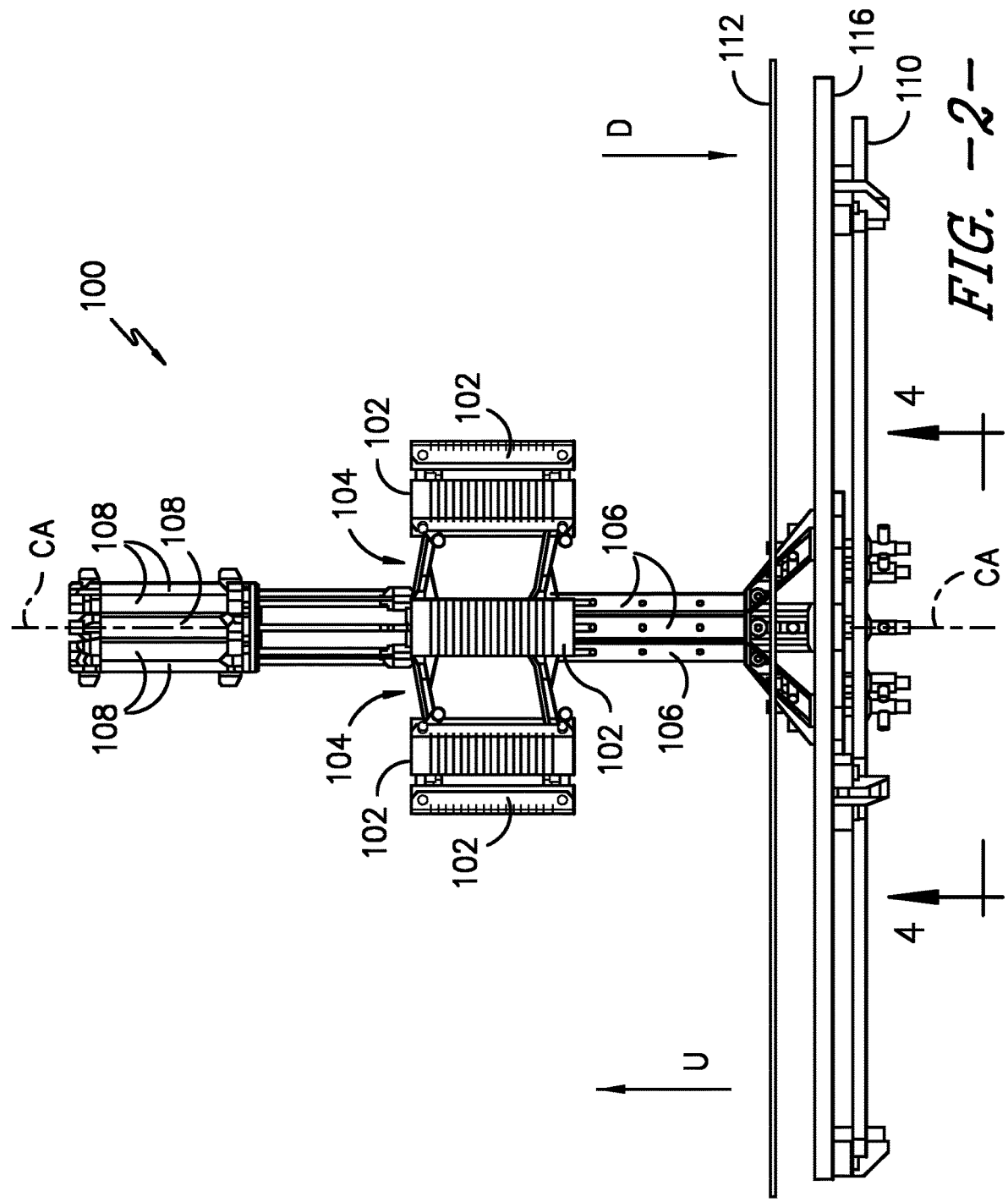

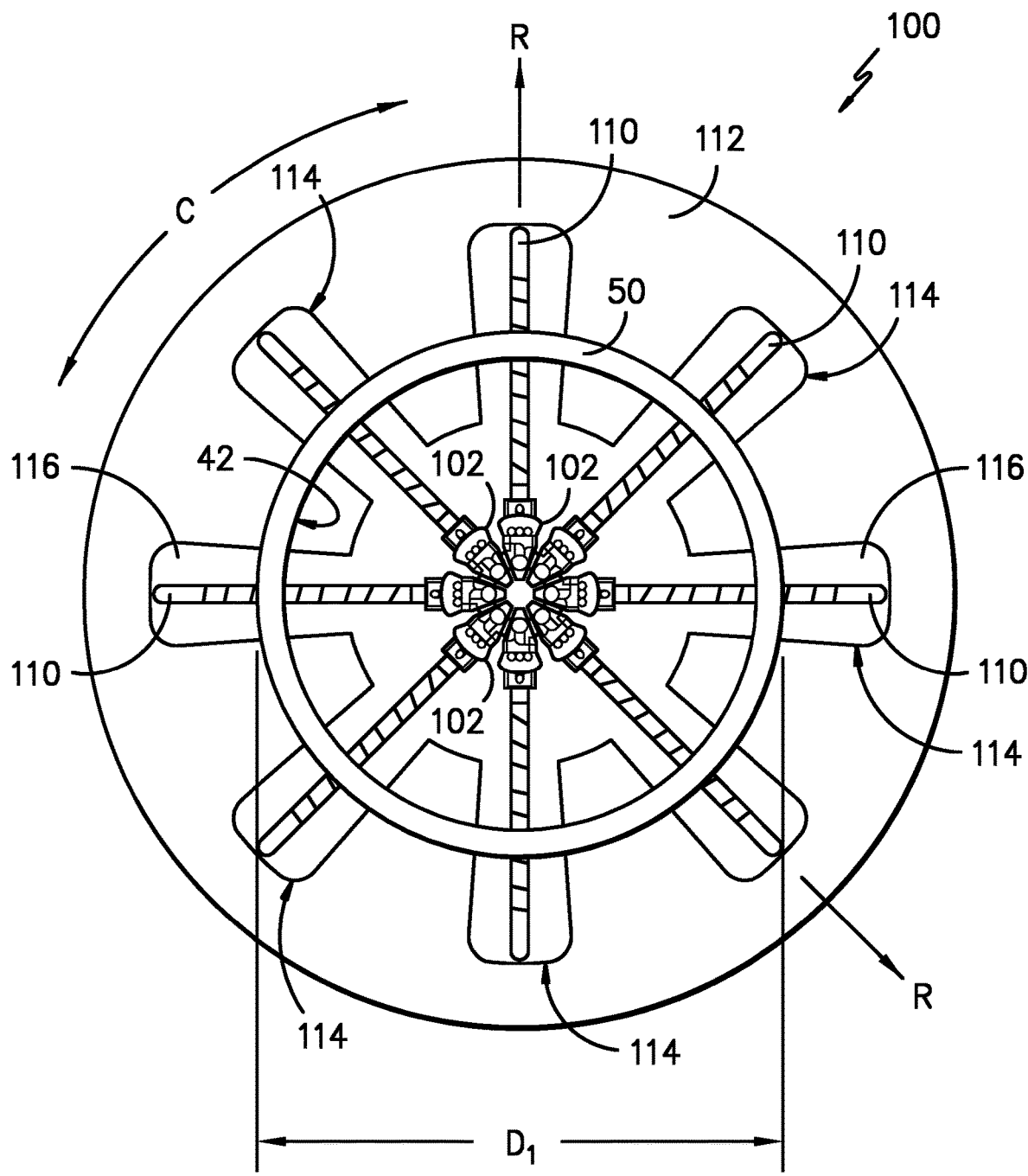
FIG. -3-

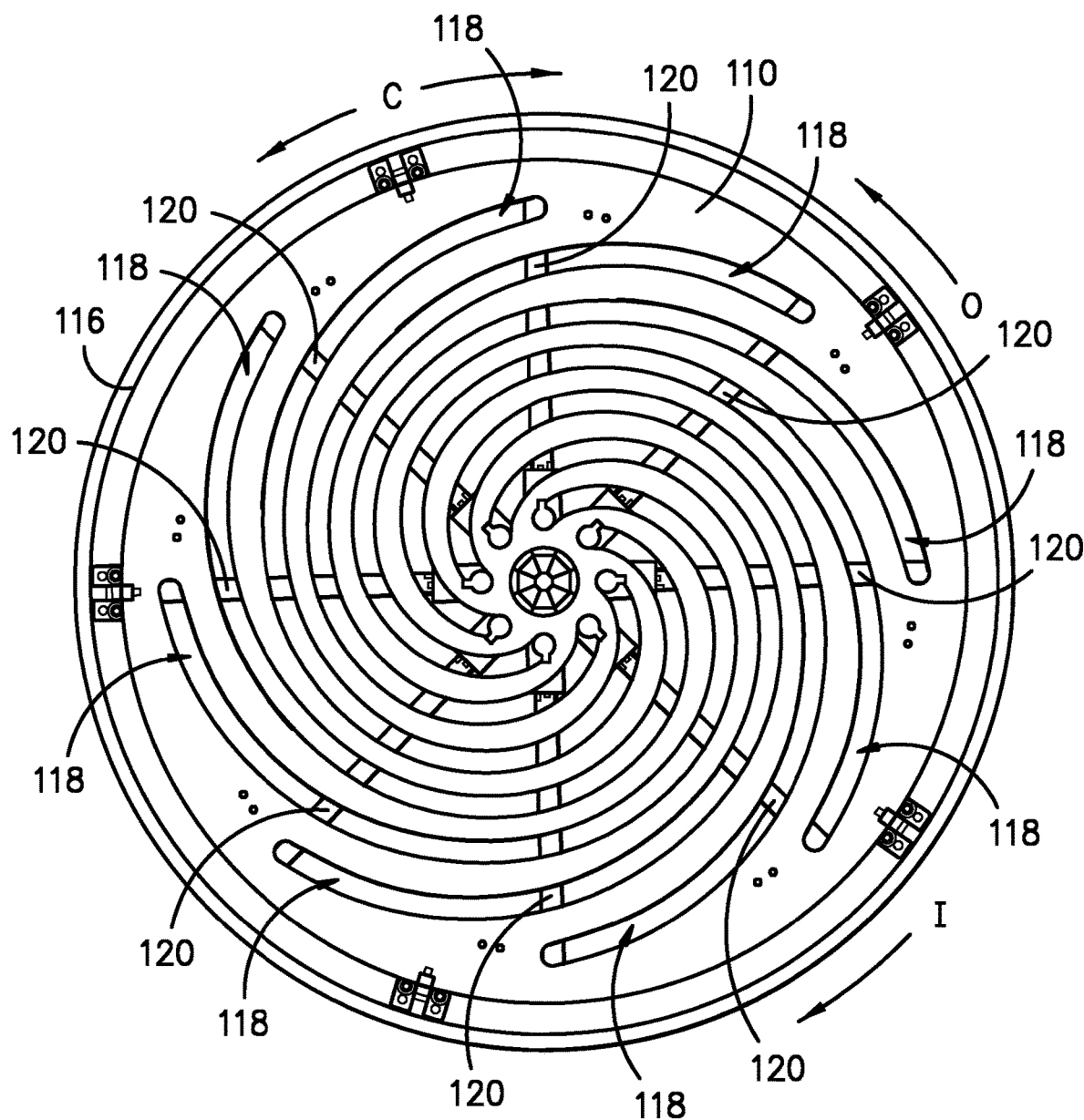
FIG. -4-

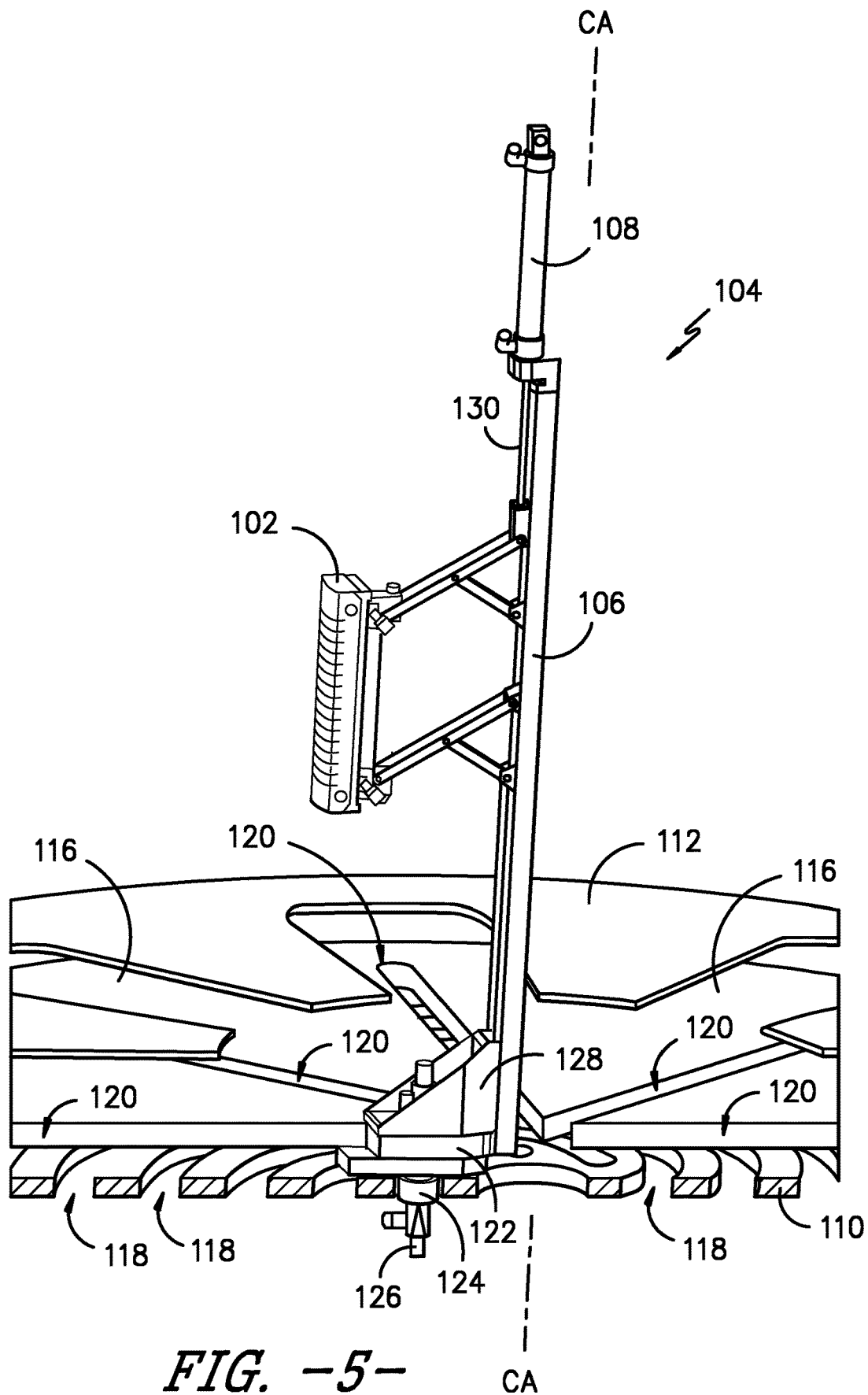
FIG. -5-

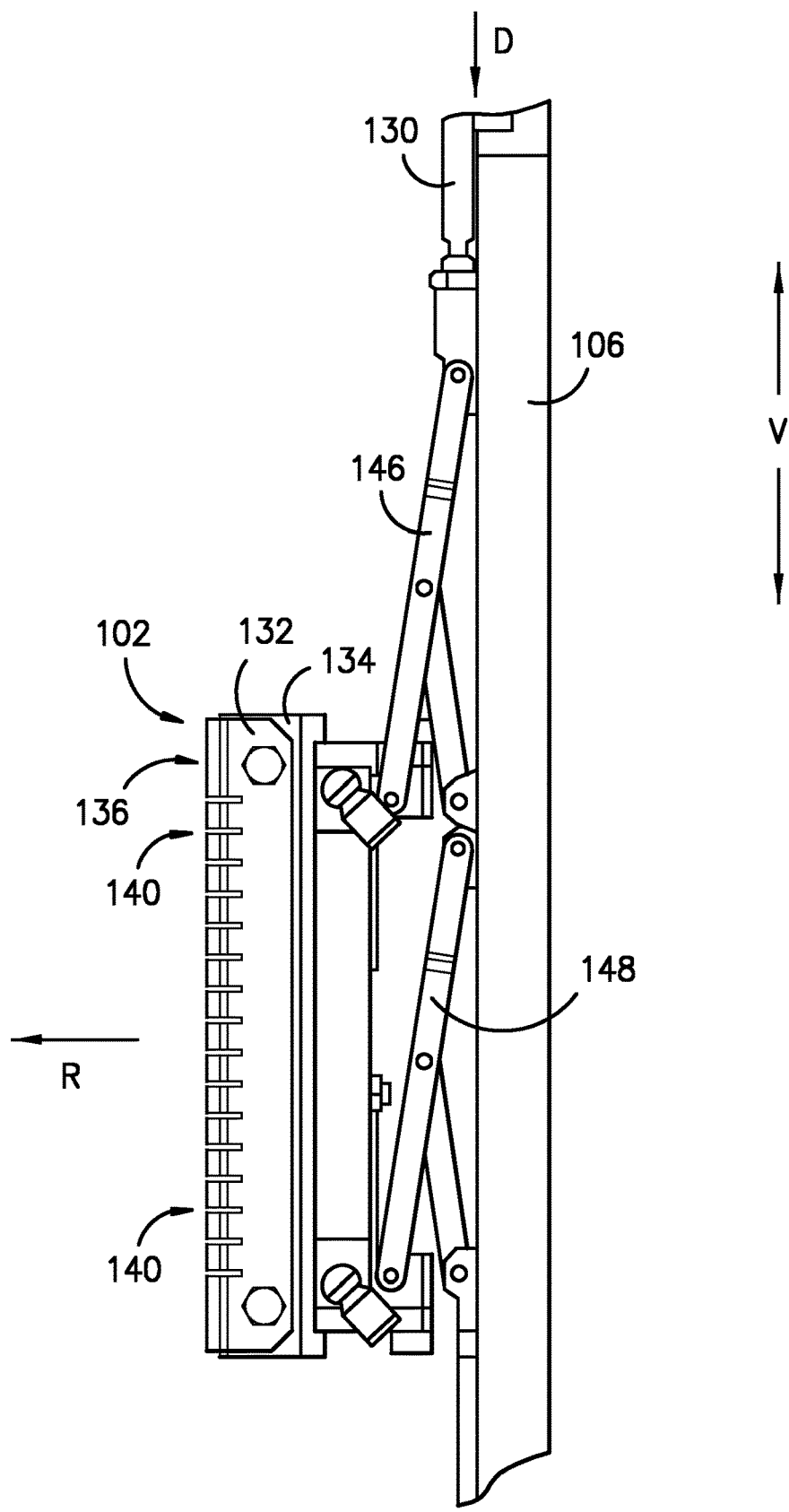
FIG. -6-

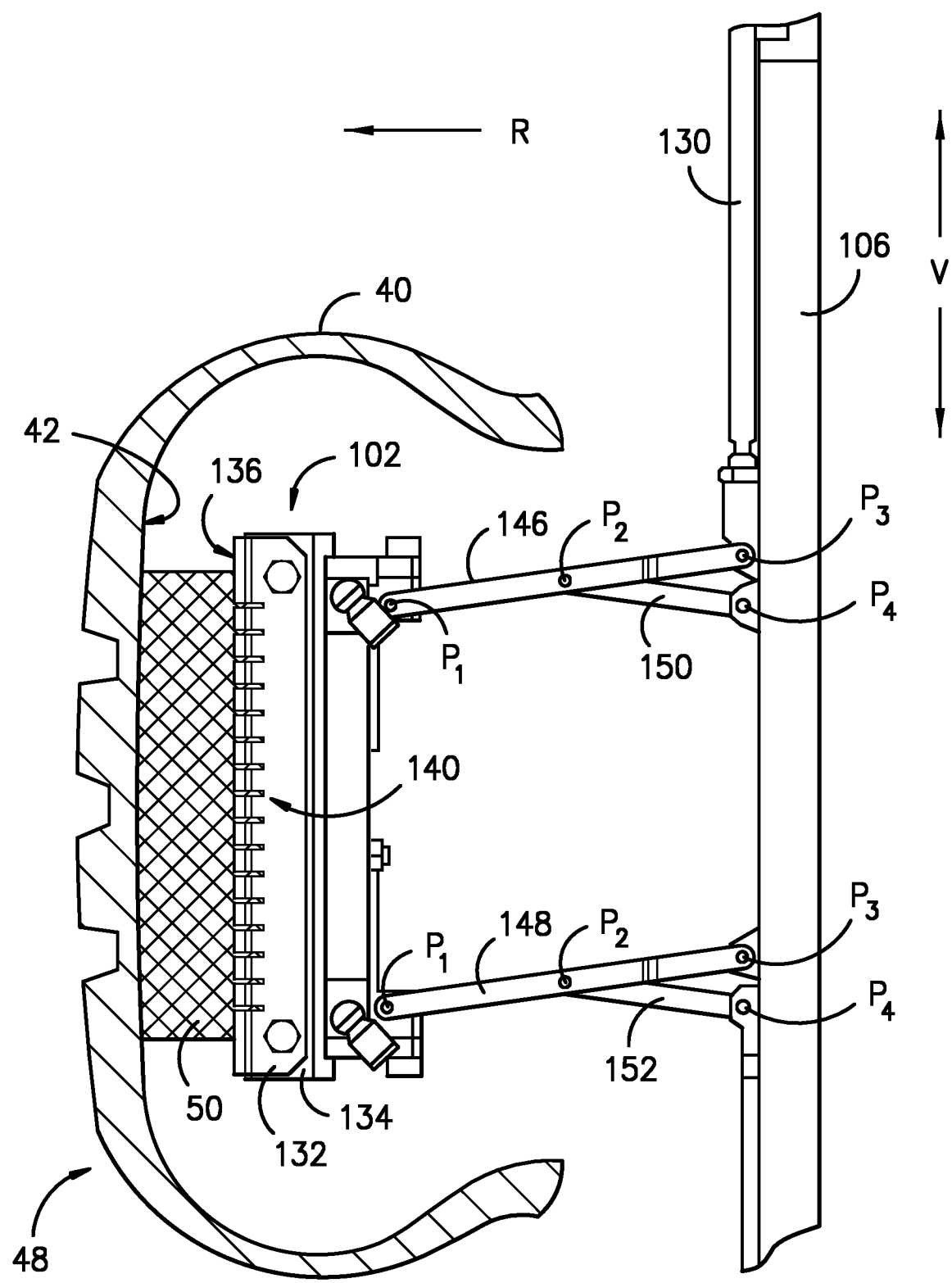
FIG. -7-

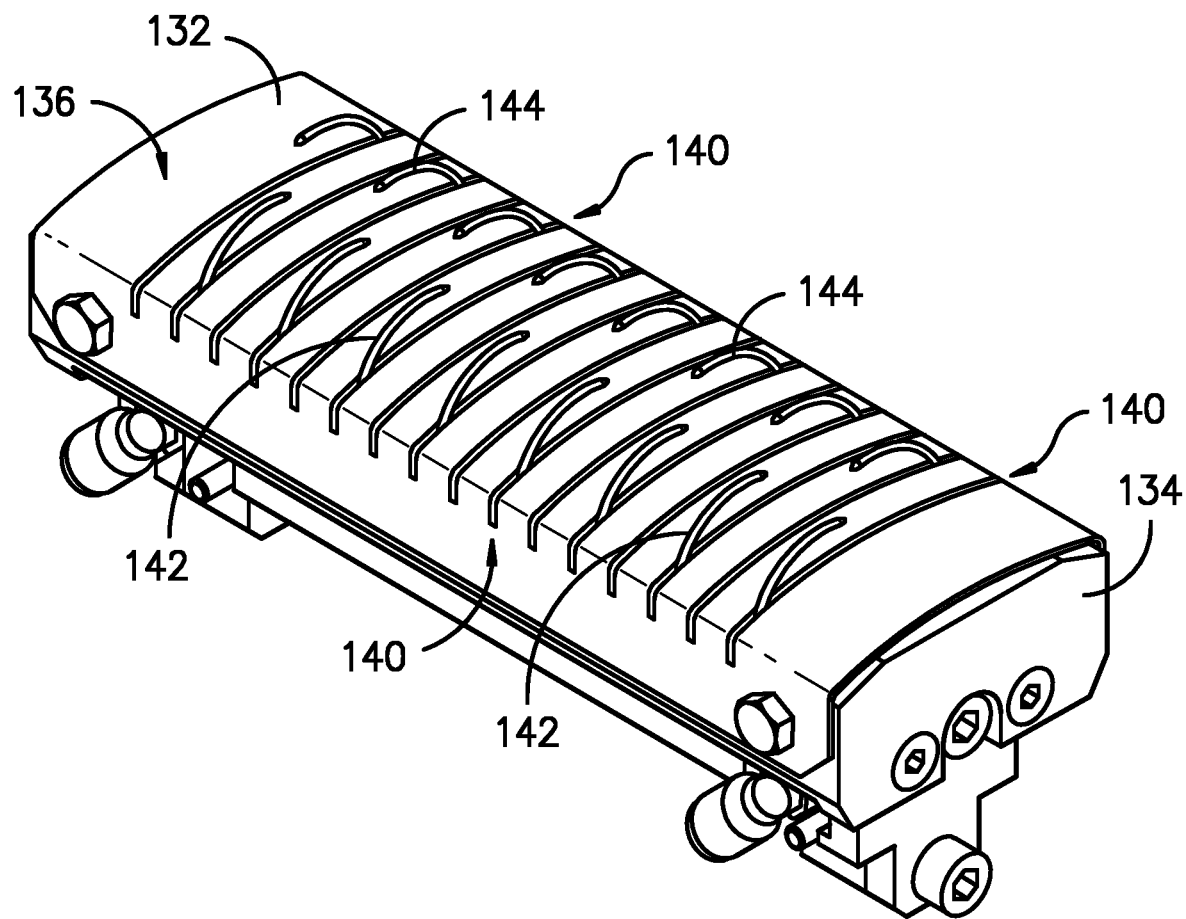
FIG. -8-

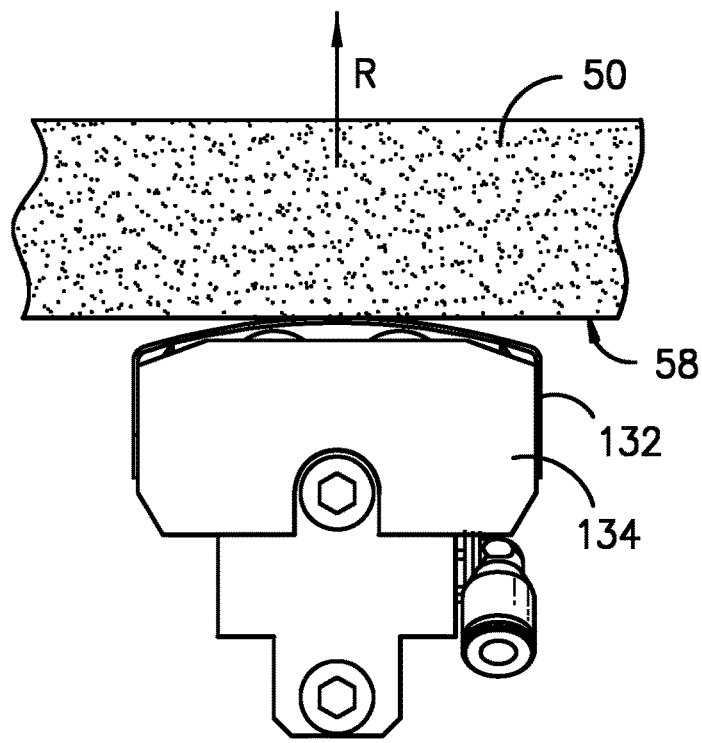
FIG. -9-
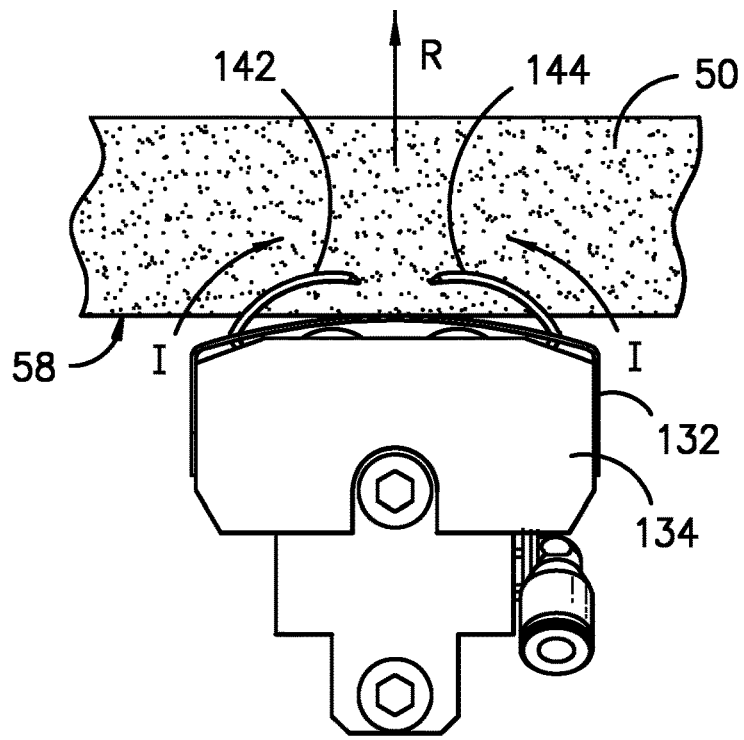
FIG. -10-

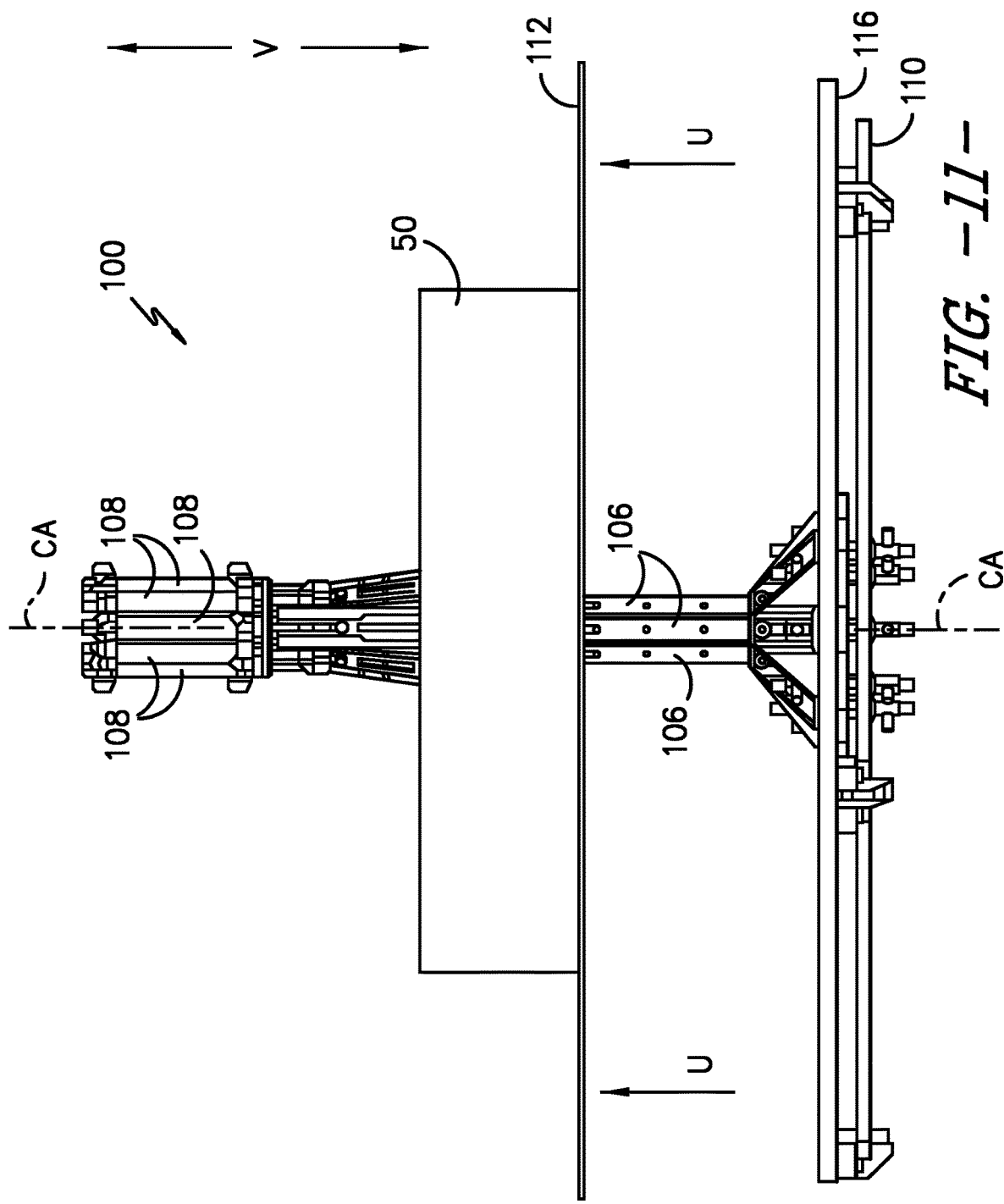

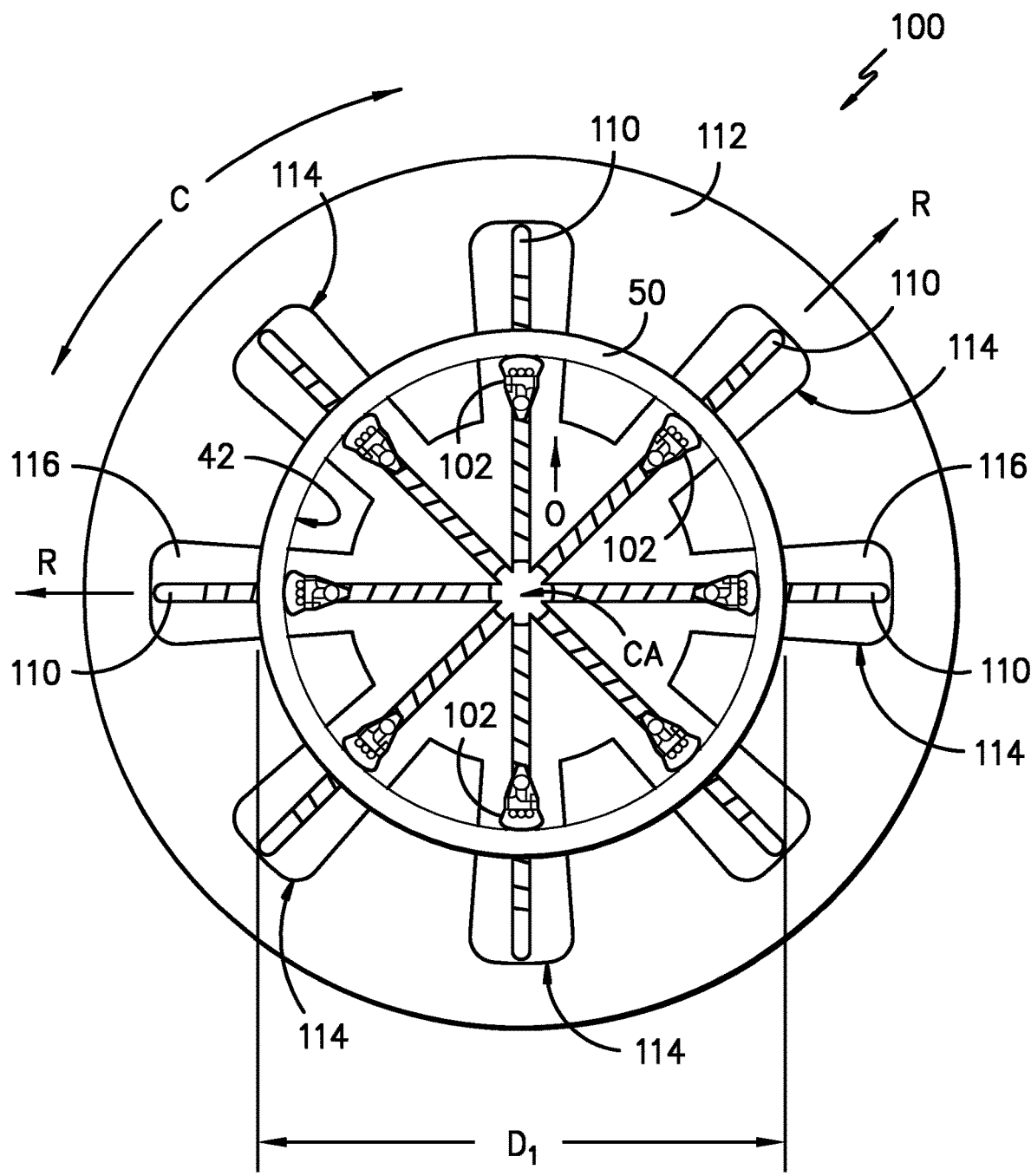
FIG. -12-

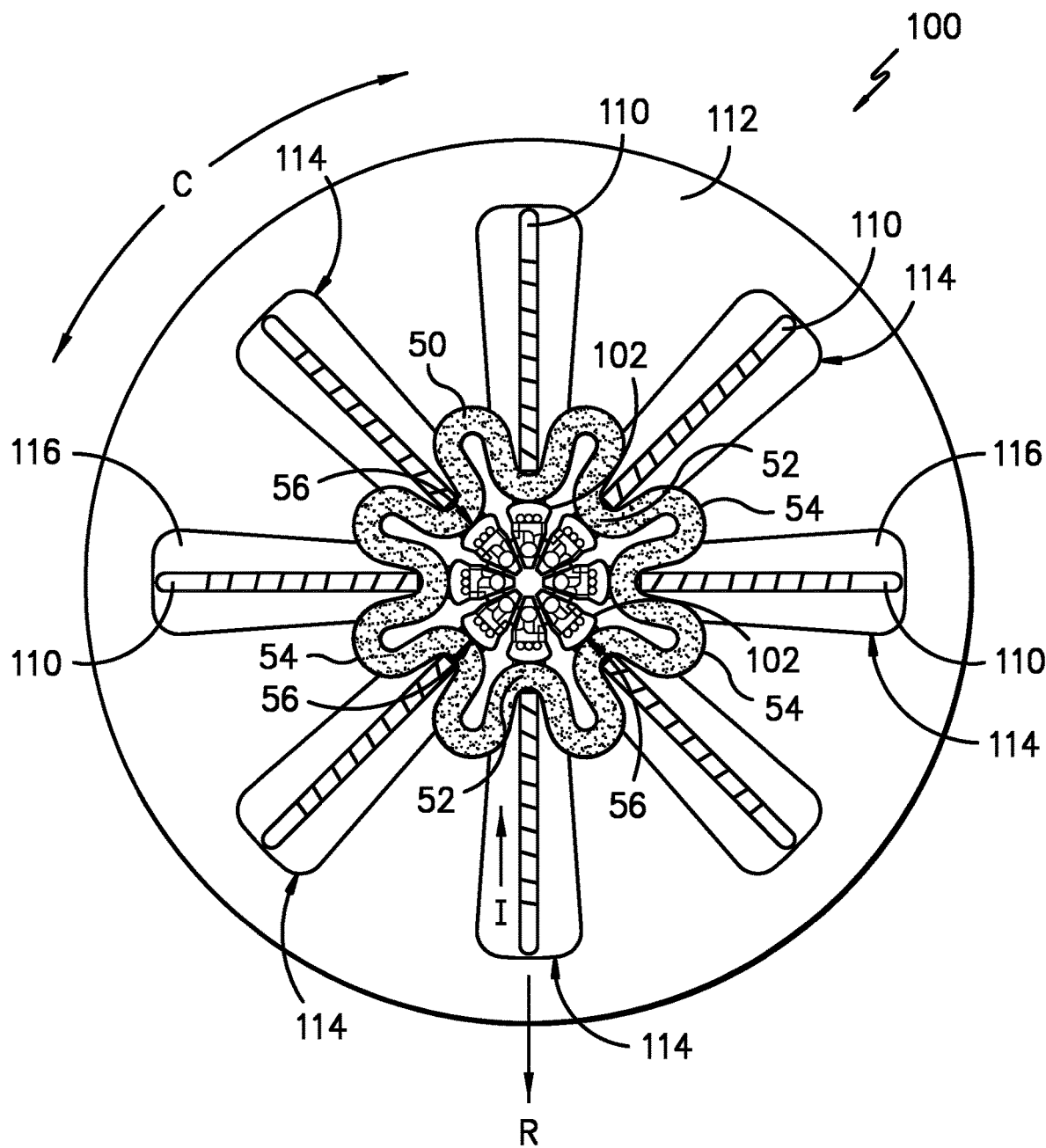
FIG. -13-

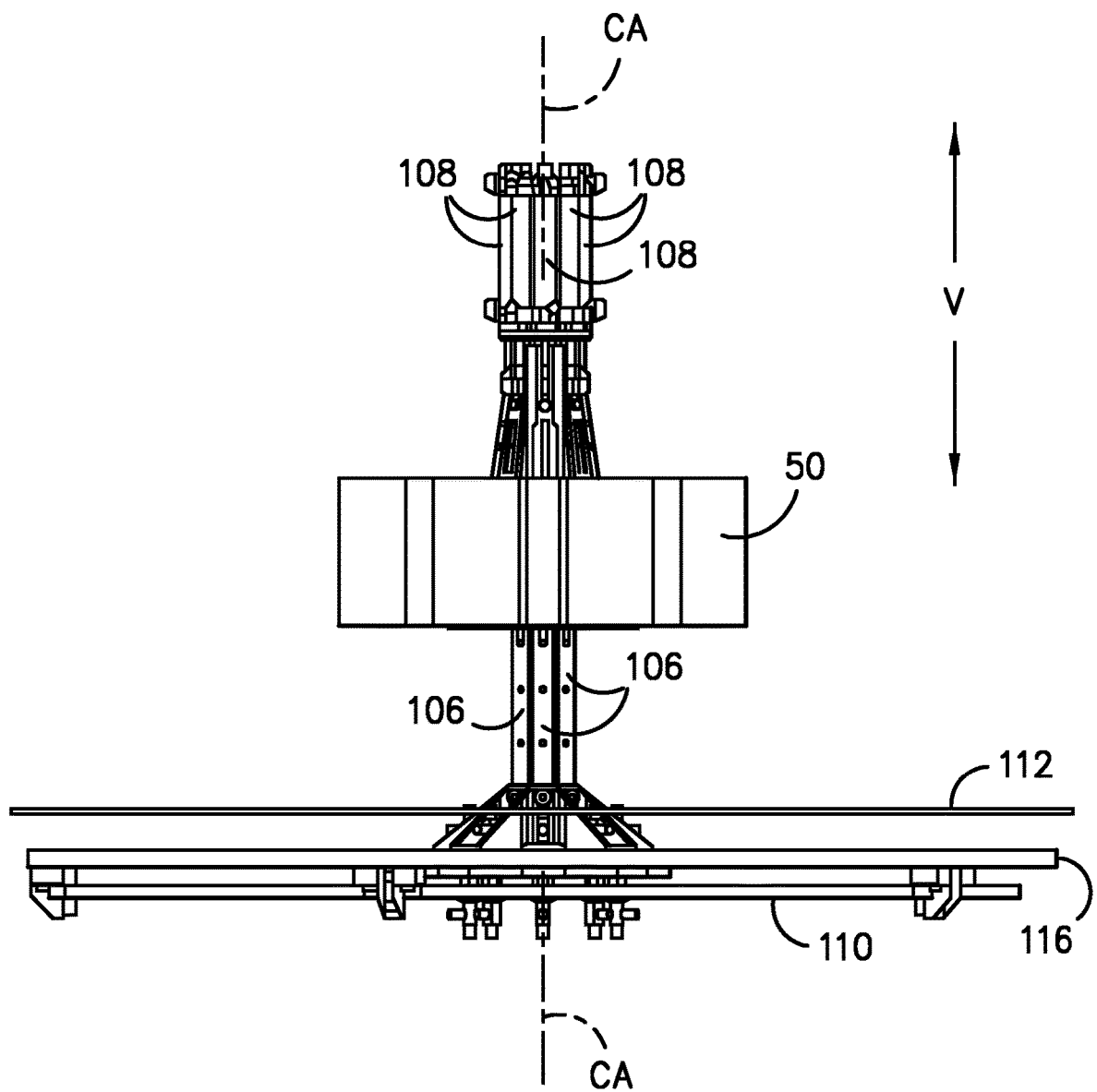
FIG. -14-

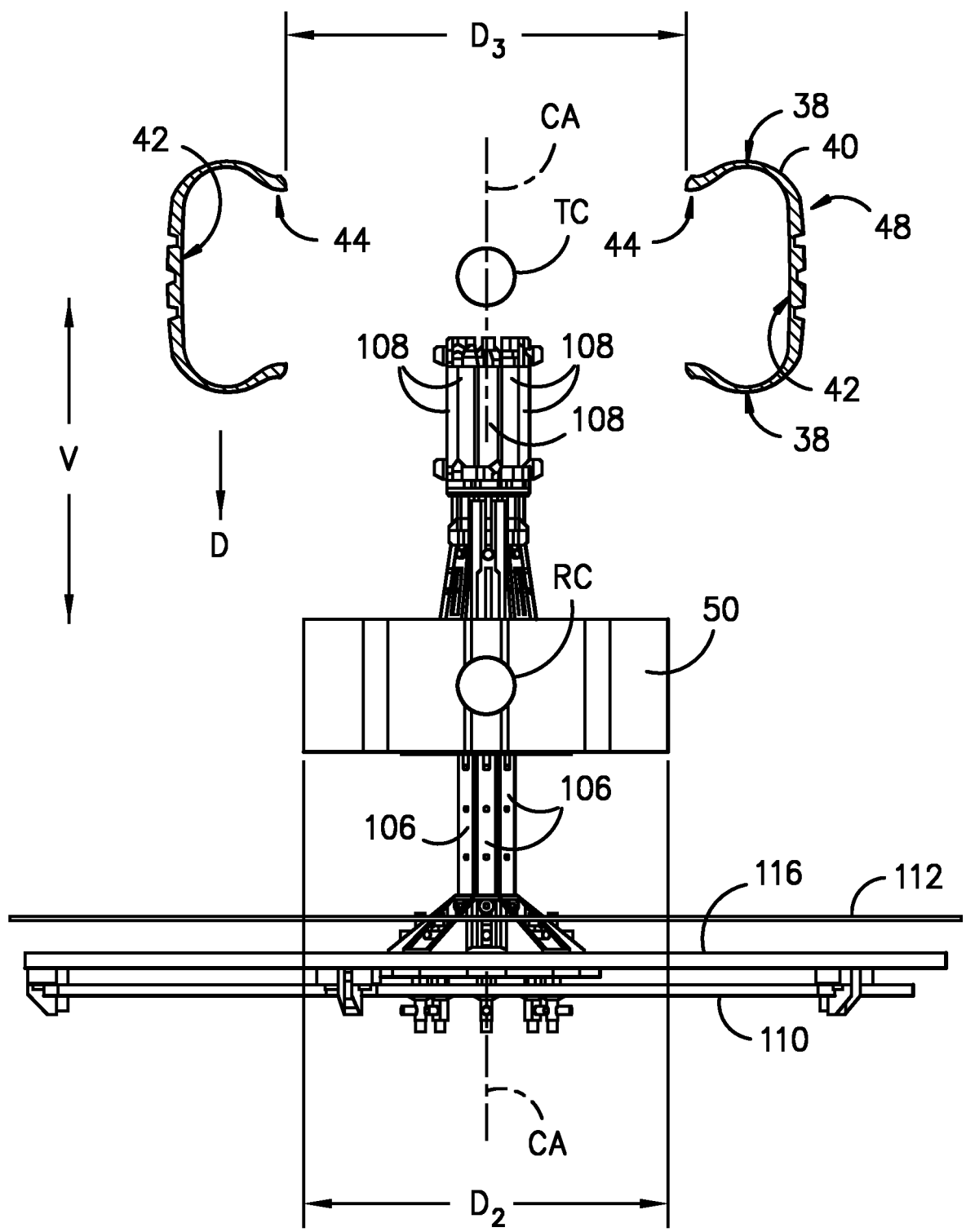
FIG. -15-

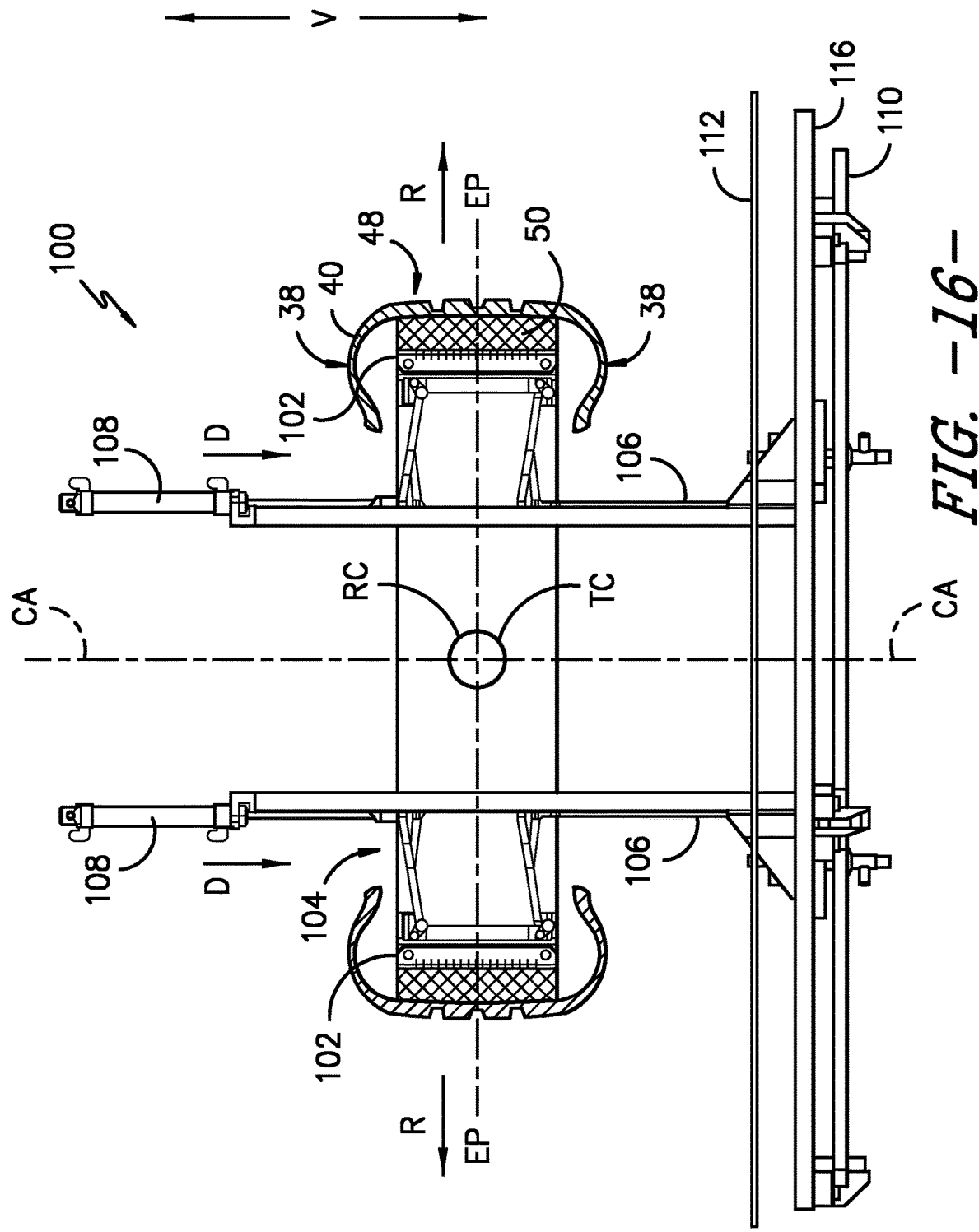

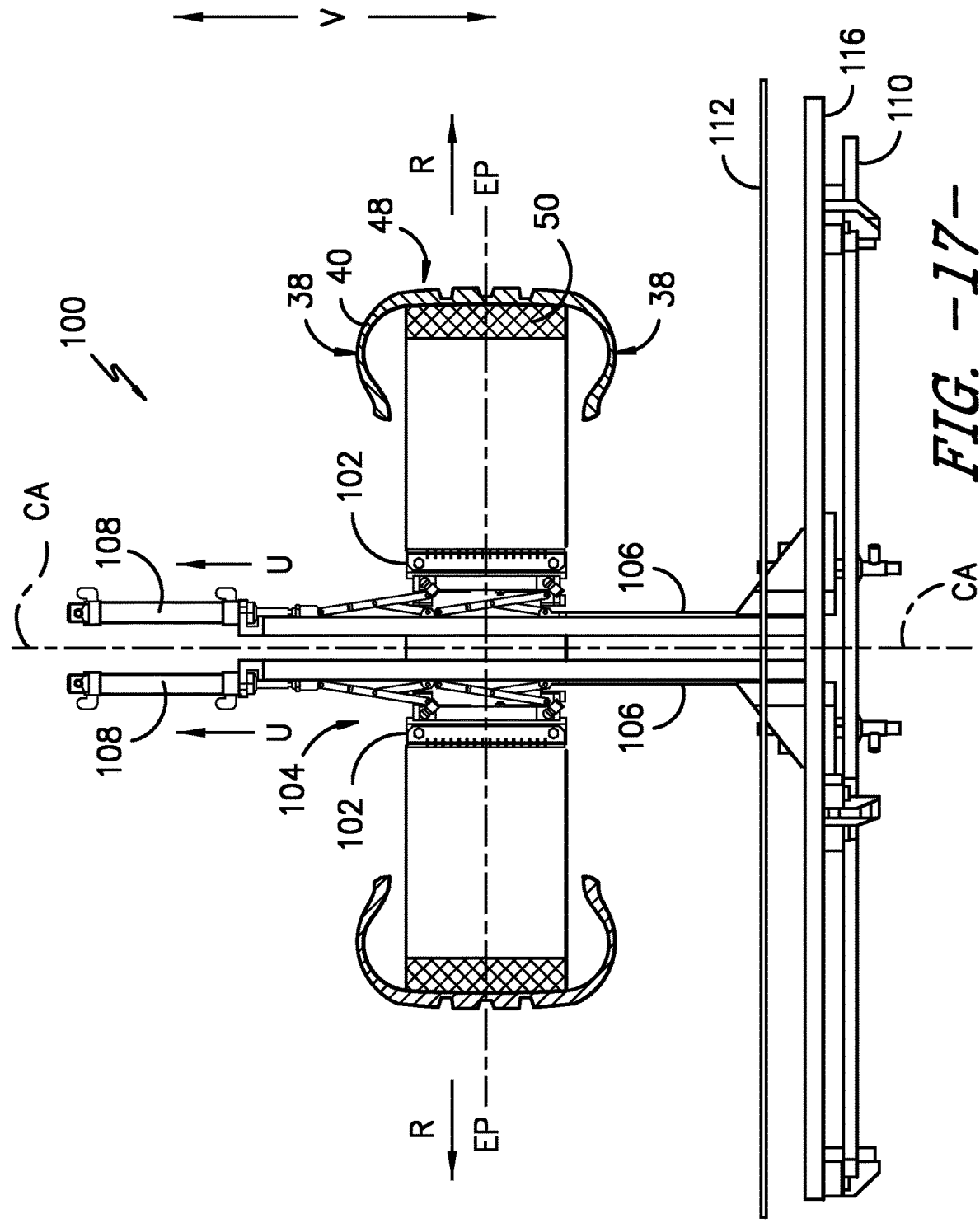

SYSTEM FOR PLACEMENT OF FOAM RING ONTO AN INTERIOR TIRE SURFACE

PRIORITY CLAIM

The present application is a 371 of international continuation of PCT/EP2015/064902, filed Jun. 30, 2015, Which claims priority to foreign application number 1430610.1,8 filed in the EP on Jul. 4, 2014, Applicants claim priority to and benefit of all such applications and incorporate all such applications herein by reference.

FIELD OF THE INVENTION

The subject matter of the present disclosure relates generally to the placement of a ring into a tire cavity against an interior surface of the tire.

BACKGROUND OF THE INVENTION

Noise emitted by a tire rolling across a road surface is attributable mainly to the vibrations of the contacting surface of the tire with road surface irregularities that generate various acoustic waves. At least a portion of these acoustic waves can be perceived by the human ear as noise both inside and outside of the vehicle. The amplitude of the noise is dependent on e.g., vibration modes of the tire and also the nature of the road surface on which the vehicle moves. The frequency range corresponding to the noise generated by the tire typically ranges from about 20 Hz to 4000 Hz.

Noise outside the vehicle can be attributed to various interactions between e.g., the tire and the road surface and the tire and the air, each of which can cause discomfort to persons along the moving vehicle. The sources of such noise include the impact of the roughness of the road with the contact area of the tire as well as noise generated due to the arrangement of the elements of the tread and its resonance along different paths. The frequency range for such noise can range from about 300 Hz to about 3000 Hz.

Regarding the noise heard inside the vehicle, the modes of sound propagation include vibrations transmitted through the wheel center and the suspension system (up to about 400 Hz) as well as vibrations from aerial transmission of acoustic waves, which can include the high frequency spectrum (about 600 Hz and over).

One important contribution to the noise heard inside the vehicle is provided by cavity noise, which refers to the discomfort caused by the resonance of the air within the tire cavity. This cavity noise is predominant in a specific frequency spectrum between 200 Hz and 250 Hz depending on the geometry of the tire.

To reduce the rolling noise of a tire, particularly cavity noise, it is known to provide the inner wall of the tire with a layer of foam such as e.g., a foam as described in patents or patent applications WO 2006/117944 or U.S. Pat. No. 7,975,740, WO 2007/058311 and U.S. 2009/0053492, U.S. 2007/0175559, WO 2008/062673 and U.S. 2010/0038005, U.S. 2009/0053492, WO 2010/000789 and U.S. 2011/0308677, EP 1529665 or U.S. Pat. No. 7,182,114.

Challenges exist with development of processes and equipment for repeatedly locating the foam in the tire cavity and along the interior surface or wall. For example, tires are currently produced in a wide range of sizes and shapes requiring either different placement machines or adjustability of such machines. Also, if the foam is to be placed by insertion in the tire cavity against the inner surface of the tire in the crown portion, navigation past the tire seat must be considered. The tire seat has a smaller diameter relative to the diameter of the inner surface of the tire. Other challenges also exist.

Accordingly, a system for positioning noise attenuating foam inside a tire against the interior surface would be useful. Such a system that can consistently position the foam over a range of different tires sizes and shapes would be beneficial. Such a system that can be automated would also be particularly useful.

SUMMARY OF THE INVENTION

The present invention provides a system for placement of noise attenuating foam along an inside surface of a tire to attenuate cavity noise. The system can be used with tires of various sizes and shapes such that different foam sizes may be utilized. The system provides for automating the process of foam placement in a manner that allows for consistent placement of the foam during e.g., tire manufacture. Additional objects and advantages of the invention will be set forth in part in the following description, or may be apparent from the description, or may be learned through practice of the invention.

In one exemplary embodiment of the present invention, a device for placement of a ring onto an interior surface of a tire is provided. The device defines a central axis. The device includes a plurality of holders arranged around the central axis and configured for selectively holding and releasing the ring. A plurality of telescoping arm assemblies are arranged around the central axis, each arm assembly supporting at least one of the holders. Each arm assembly is configured for selectively extending and retracting the holder along a radial direction that is orthogonal to the central axis. A positioning plate is rotatable about the central axis and includes a plurality of guides extending from the central axis along the radial direction. Each guide is in receipt of at least one telescoping arm assembly and is configured so that rotation of the positioning plate about the central axis causes the telescoping arm assemblies to move along the guides and outwardly or inwardly along the radial direction depending upon the direction of rotation of the positioning plate.

In another exemplary aspect, the present invention provides a method for placement of a ring onto an interior surface of a cavity of a tire. The ring has an outside diameter and defines radial and circumferential directions. The method includes the steps of contracting the ring along the radial direction from a first shape to a smaller, second shape, wherein second shape comprises a plurality of folds of the ring along the circumferential direction; placing the ring while in the second shape into the tire cavity; expanding the ring to the first shape and within the tire cavity so as to remove the plurality of folds of the ring along the circumferential direction; and positioning a radially-outermost surface of the ring against the interior surface of the tire.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a schematic representation of certain steps in an exemplary method of the present invention. In FIG. 1, the sidewall of an exemplary tire is not shown for purposes of additional clarity in explaining this exemplary method.

FIG. 2 is an elevation view of an exemplary embodiment of the present invention.

FIG. 3 is a top view of the exemplary embodiment of FIG. 2 supporting an exemplary foam ring.

FIG. 4 is a bottom view of the exemplary embodiment of FIG. 2.

FIG. 5 provides a perspective view of a partial cross-section of the exemplary embodiment of FIG. 2.

FIG. 6 is a partial side view of an exemplary telescoping arm assembly in a retracted position.

FIG. 7 is another partial side view of the exemplary telescoping arm assembly of FIG. 6 in an extended position so as to place the exemplary foam ring against the inside surface of a tire.

FIG. 8 is a perspective view of an exemplary holder of the present invention.

FIG. 9 is an end view of the exemplary holder of FIG. 8 before gripping an exemplary foam ring.

FIG. 10 is another end view as in FIG. 9 of the exemplary holder while gripping the foam ring.

FIG. 11 is another elevation view of the exemplary embodiment of FIG. 2 with the foam ring elevated into position for insertion into a tire cavity.

FIG. 12 is another top view of the exemplary embodiment of FIG. 2 supporting the exemplary foam ring in an exemplary first shape.

FIG. 13 is another top view of the exemplary embodiment of FIG. 2 supporting the foam ring in an exemplary second shape.

FIG. 14 is another elevation view of the exemplary embodiment of FIG. 2 with the foam ring supported by exemplary holders and a ring support plate in a lowered position.

FIG. 15 is another elevation view of the exemplary embodiment of FIG. 2 with an exemplary tire before insertion of the foam ring.

FIG. 16 is another elevation view of the exemplary embodiment of FIG. 2 illustrating positioning of the foam ring into the tire cavity against the interior surface with telescoping arm assemblies shown in an extended position.

FIG. 17 repeats the elevation view of FIG. 11 with telescoping arm assemblies shown in a retracted position.

DETAILED DESCRIPTION

For purposes of describing the invention, reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used with another embodiment to yield a still further embodiment. Thus, it is intended that the present invention covers such modifications and variations as come within the scope of the appended claims and their equivalents FIG. 1 provides a schematic representation of an exemplary method of the present invention as illustrated in steps 1A through 1D. In step 1A, an exemplary foam ring 50 is provided for insertion in the cavity 46 of a tire 40 for purposes of noise attenuation. Foam ring 50 is shown in a first shape, which corresponds to its original, uncontracted state before insertion into tire 40. Foam ring 50 defines a radial direction R and a circumferential direction C.

In this first shape, ring 50 has an outside diameter $D_1$ that exceeds the inner seat diameter $D_3$ of the seat 44 of tire 40. By way of example, foam ring 50 may comprise a polyurethane foam as described in WO/2013/182477, but other materials may also be used. Similarly, the shape and dimensions of ring 50 shown in FIG. 1 and other figures herein are provided by way of example only as other constructions may be used as well. In step 1A, an adhesive may be applied to the radially-outermost surface 60 of foam ring 50 for purposes of adhering foam ring 50 to interior surface 42 (e.g., the inner liner) of tire 40. Alternatively, the adhesive may have previously been applied to the interior surface 42 of the tire 40 for the same purposes.

In step 1B, foam ring 50 is contracted along radial direction R from the first shape shown in step 1A to a smaller, second shape. In this second shape, foam ring 50 forms a plurality of outward opening folds 52 and inward opening folds 54 in an alternating manner along circumferential direction C (also shown e.g., in FIG. 13). For this exemplary embodiment, the folds are U-shaped and provide a "daisy" configuration with a contracted diameter $D_2$ as depicted in step 1B. Contracted diameter $D_2$ is less than the original outside diameter $D_1$ and is also less than seat diameter $D_3$. In one exemplary aspect of the present invention, the contracted, second shape shown in step 1B is created by pulling foam ring 50 radially inward at multiple points 56 along circumferential direction C so as to form folds 52 and 54.

As shown in step 1C, foam ring 50 is next inserted through the seat 44 of tire 40 and into tire cavity 46. Because contracted diameter $D_2$ is less than seat diameter $D_3$, foam ring 50 may be readily placed into tire cavity 46. The folded or contracted configuration used for the second shape of foam ring 50 allows the present invention to be used with a variety of different tire shapes and sizes.

In step 1D of FIG. 1, foam ring 50 is expanded back to the first shape. This step may performed by moving the foam ring 50 radially outward at multiple points 56 along circumferential direction C so as to remove the plurality of folds 52 and 54. The inherent resiliency of the foam ring 50 may be sufficient to restore foam ring 50 back to its first shape during the expanding step 1D. Notably, it should be understood that foam ring 50 may not be returned completely to original diameter $D_1$ upon expansion and placement against interior surface 42 and such is not necessarily required.

As foam ring 50 is expanded, its radially-outermost surface 60 is eventually placed into contact with the interior surface 42 of tire 40 along its crown portion. If an adhesive has been applied to radially-outermost surface 60, such contact will allow foam ring 50 to be adhered to the interior surface 42 of tire 40. Once foam ring 50 is secured to interior surface 42, tire 40 can be e.g., mounted onto a wheel of a vehicle to provide noise attenuation during operation of the vehicle.

A side view of an exemplary foam ring placement device 100 is shown in FIG. 2 while a top view is shown in FIG. 3. Device 100 defines a central axis CA (FIG. 2) along its centerline and a radial direction R (FIG. 3) that is orthogonal to central axis CA. For this exemplary embodiment, central axis CA is shown parallel to vertical direction V. A plurality of holders 102 are positioned adjacent to each other along circumferential direction C around central axis CA. Holders 102 are configured for selectively holding and releasing foam ring 50 as will be further described. While eight holders 102 are shown for this embodiment, it should be understood that in other embodiments a different number of holders 102 may be employed.

A plurality of telescoping arm assemblies 104 are also arranged around central axis CA. Each telescoping arm assembly 104 supports at least one holder 102 and is configured for selectively extending and retracting holder 102 along radial direction R. Stated differently, telescoping arm assemblies can move holders inwardly and outwardly relative to central axis CA along radial direction R. In FIG. 2, holders 102 are shown in an extended position while in FIG. 3 holders 102 are shown in a retracted position. Additional details of telescoping arm assemblies 104 will be further described.

FIG. 3 also depicts an exemplary foam ring 50 that has been placed onto a ring support plate 112. Various mechanisms (not shown) can be used to raise or lower (arrows U and D in FIG. 2) ring support plate 112 along central axis CA. Ring support plate 112 includes a plurality of slots 114 positioned about the circumferential direction C for providing clearance of other elements of ring placement device 100. The size of ring support plate 112 allows for foam rings 50 of various diameters $D_1$ to be supported during operation of device 100.

Each telescoping arm assembly 104 includes a post 106 that extends vertically upward from a positioning plate 110 and a fixed plate 116. Positioning plate 110 is rotatable about central axis CA relative to fixed plate 116 and is used to move each post 106 outwardly or inwardly along radial direction R depending upon the direction of rotation of plate 110. One or more mechanisms (not shown) can be used for rotating position plate 110 during operation of device 100.

FIG. 4 provides a bottom view (along the direction of arrows 4-4 in FIG. 2) of positioning plate 110. FIG. 5 provides a perspective view of cross-section of plates 110, 112, and 116 along with a single telescoping arm assembly 104 for purposes of additional clarity in describing this exemplary device 100 of the invention. Each post 106 of a telescoping arm assembly 104 is attached with a support base 128, which is connected with a boss 122. Boss 122 is received into a linear slot 120 (defined by fixed plate 116) that extends along radial direction R. Boss 122 is freely movable within linear slot 120 such that telescoping arm assembly 104 can move inwardly or outwardly along radial direction R.

An axle 126 extends through support base 128 and supports a roller 124 that is freely rotatable about axle 126. Roller 124 is received into a guide 118 that, for this exemplary embodiment, is configured as a spiral slot 118 that spirals outwardly along radial direction R from central axis CA. As best seen in FIG. 4, a plurality of such spiral slots 118 are defined by positioning plate 110 and are positioned adjacent to one another with each slot 118 receiving a roller 124 of one of the telescoping arm assemblies 104.

The rotation of positioning plate about central axis CA and the reaction forces of rollers 124 in spiral slots 118 and bosses 122 in linear slots 120 causes movement of each telescoping arm assembly 104 outwardly or inwardly along radial direction R depending upon the direction of rotation. For example, rotation in the direction of arrow O (FIG. 4) causes the telescoping arm assemblies 104 to move away from central axis CA (and each other) or outwardly along radial direction R. Conversely, rotation in the direction of arrow I (FIG. 4) causes the telescoping arm assemblies 104 to move towards central axis CA (and each other) or inwardly along radial direction R. As such, positioning plate 110 can be used to selectively position telescoping arm assemblies relative to foam ring 50 on ring support plate 112.

FIG. 6 provides a close-up and partial side view of telescoping arm assembly 104 in a retracted view. FIG. 7 provides the same view with telescoping arm assembly 104 in an extended position with a holder 102 placing foam ring 50 against the interior surface 42 along the crown portion 48 of tire 40. Holder 102 is connected with post 106 by a plurality of links 146, 148, 150, and 152 that pivot relative to post 106 as holder 102 is extended or retracted along radial direction R.

More particularly, a pair of slidable links 146, 148 are pivotally connected at one end by pivot points $P_1$ to holder 102, and at another end by pivot points $P_3$ to post 106. Pivot points $P_3$ are able to move or slide up or down post 106 along vertical direction V. A motor 108 (FIG. 2), such as e.g., a solenoid or pneumatic cylinder, is used to selectively control the position of pivots points $P_3$ by extension or retraction of shaft 130.

Slidable links 146 and 148 are pivotally connected at pivot points $P_2$ to fixed links 150 and 152, which are in turn pivotally connected along an opposite end at pivot points $P_4$ to post 106. The position of pivot points $P_4$ is fixed relative to post 106. For this embodiment, pivot points $P_2$ are located at about a midpoint along the length of slidable links 146 and 148.

As shaft 130 is extended downwardly (arrow D in FIG. 6), pivot points $P_3$ slide downwardly. However, a reaction force provided by fixed links 150 and 152 causes slidable links 146 and 148 to pivot outwardly along radial direction R thereby extending holder 102 along radial direction R away from central axis CA. Conversely, as shaft 130 is withdrawn upwardly (arrow U in FIG. 7), pivot points $P_3$ slide upwardly and slidable links 146 and 148 pivot inwardly along radial direction R—thereby withdrawing holder 102 along radial direction R and retracting holder 102 towards central axis CA.

FIG. 8 provides a perspective view of an exemplary holder 102 while FIGS. 9 and 10 provide end views of such holder 102. As shown, holder 102 includes a receptacle 134 with a cover 132 providing a foam ring contact surface 136. A plurality of slots 140 are defined by contact surface 136. Slots 140 extend laterally over contact surface 136 and are arranged parallel to each other along the longitudinal direction L of holder 102. A plurality of pins 142, 144 are extendable through slots 140. More particularly, pins 142 are provided in a row along one side of contact surface 136 while pins 144 are provided in a row along the other side of contact surface 136. Pins 142 and 144 are disposed in an alternating manner along slots 140.

Holders 102 are employed to grasp or hold foam ring 50 during its contracting, expanding, and positioning in tire 40. In one exemplary method, as depicted in FIG. 9, contact surface 136 is positioned against the radially-innermost surface 58 of foam ring 50. Pins 142 and 144 can be extended (arrows I) through slots 140 to project into foam ring 50 and thereby secure its position onto contact surface 136 of holder 102. Once foam ring 50 is positioned against the interior surface 42 of tire 40, pins 142 and 144 can be retracted so as to release foam ring 50 from holder 102.

An exemplary method of using foam ring placement device 100 to position foam ring 50 will now be described with reference to the various figures. It should be understood that the steps set forth herein, including their sequence, is provided by way of example and other steps and/or sequences may be employed as well. Beginning with FIGS. 3 and 11, foam ring 50 is placed onto ring support plate 112. For this starting operation, holders 102 are fully retracted along radial direction R against posts 106 (FIG. 2). Posts 106 are also at their radially-innermost position nearest central axis CA (FIG. 2) with rollers 124 at their radially-innermost position along guides 118 (FIG. 4).

Next, ring support plate 112 is moved (arrows U in FIG. 11) relative to central axis CA so as to position foam ring 50 at the same height along the vertical direction as holders 102. In FIG. 11, foam ring 50 is shown in its original, first shape with diameter $D_1$ as previously described in step 1A of FIG. 1.

Referring primarily to FIG. 12, positioning plate 110 is rotated (direction O in FIG. 4) so as to cause rollers 124 of the telescoping arm assemblies 104 to track along guides 118 and move the assemblies 104 radially outward (arrow O). Rotation of positioning plate 110 is continued until each holder's contact surface 136 is placed in contact with (or in close proximity) to the radially innermost surface 58 of foam ring 50. In the event foam ring 50 has been placed on ring support plate 112 in a non-concentric manner relative to central axis CA, the radially-outward movement of telescoping arm assemblies 104 within slots 114 of ring support plate 112 will advantageously center foam ring 50. Additionally, because of the range of movement available for telescoping arm assemblies 104 relative to positioning plate 110, foam rings 50 of various diameters $D_1$ (FIG. 1) can be positioned using device 100. Once holders 102 have been positioned as just described, pins 142 and 144 are deployed into foam ring 50 as previously described with reference to FIGS. 9 and 10.

Next, in order to provide foam ring 50 with an overall diameter $D_2$ less than the seat diameter $D_3$ of tire 40, positioning plate 110 is rotated (arrow I in FIG. 4) in a manner that causes telescoping arm assemblies to move radially inward towards central axis CA. As illustrated in FIG. 13, this movement pulls foam ring 50 at multiple points 56 along circumferential direction C to provide a contracted or second shape having a plurality of folds 52 and 54 in a manner as previously described with reference to step 1B in FIG. 1.

As shown in FIG. 14, ring support plate 112 is lowered (arrows D) in preparation for placement of tire 40. Foam ring 50 remains fixed in position by holders 102, and also remains in its second shape.

Referring now to FIG. 15, tire 40 is now positioned with its center TC along central axis CA and above device 100. Tire 40 is lowered (arrow D) until along vertical direction V until its center TC coincides with the center RC of foam ring 50 as depicted in FIG. 16. Because the overall diameter $D_2$ of foam ring 50 is less than the seat diameter $D_3$ of tire 40, foam ring 50 can be readily placed within tire cavity 46 as previously described with reference to step 1C in FIG. 1.

Referring now to FIG. 16, motors 108 on telescoping arm assemblies 104 are deployed to move shafts 130 downward (arrows D) and thereby cause holders 102 to extend outwardly along radial direction R. Additionally, positioning plate 110 is again rotated (arrow O in FIG. 4) in a manner that causes telescoping arm assemblies 104 to move outward along the radial direction R so as to move foam ring 50 toward tire 40 until the radially-outermost surface of foam ring 50 is positioned against the interior surface 42 of tire 40 along crown portion 48. As previously stated, the use of adhesive allows foam ring 50 to be adhered to tire 40. Ability to positioning holders 102 over a wide range along radial direction R allows tire of different shapes and sizes to be equipped with a foam ring.

Once ring 50 is installed, positioning plate 110 is rotated (arrow I in FIG. 4) so as to move telescoping arm assemblies 104 towards each other and central axis CA. Motor 108 is now activated to cause shafts 130 to return as shown by arrows U in FIG. 17, which also retracts holders 102 along radial direction R away from tire 40 and towards central axis CA. Tire 40 with installed support ring 50 can now be lifted from the machine 100 along central axis CA and the process repeated for another tire and ring.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. A device for placement of a ring onto an interior surface of a tire, the device defining a central axis, the device comprising:
   a plurality of holders arranged around the central axis and configured for selectively holding and releasing the ring;
   a plurality of telescoping arm assemblies arranged around the central axis, each arm assembly supporting at least one of the holders, each arm assembly configured for selectively extending and retracting the holder along a radial direction that is orthogonal to the central axis;
   each telescoping arm assembly comprising a post and a plurality of links connected between at least one holder and the post, the links configured for pivoting relative to the post so as to extend and retract the at least one holder along the radial direction; and
   a positioning plate rotatable about the central axis, the positioning plate comprising a plurality of guides that spiral outwardly along the radial direction from the central axis, each guide in receipt of at least one telescoping arm assembly, each guide configured so that rotation of the positioning plate about the central axis causes the telescoping arm assemblies to move along the guides and outwardly or inwardly along the radial direction depending upon the direction of rotation of the positioning plate.

2. The device for placement of a ring onto an interior surface of a tire as in claim 1, wherein each guide comprises a spiral slot extending outwardly along the radial direction from the central axis.

3. The device for placement of a ring onto an interior surface of a tire as in claim 2, further comprising a plurality of rollers, each roller attached to at least one of the telescoping arm assemblies and configured to track along one of the guides as the positioning plate is rotated about the central axis.

4. The device for placement of a ring onto an interior surface of a tire as in claim 3, wherein the holders each comprise a plurality of pins configured to selectively engage and disengage the ring.

5. The device for placement of a ring onto an interior surface of a tire as in 3, wherein the holders each comprise a contact surface defining a plurality of slots; and a plurality of pins configured to selectively extend and retract through the slots in order to engage and disengage the ring.

6. The device for placement of a ring onto an interior surface of a tire as in claim 1, wherein each telescoping arm assembly further comprises a motor supported by the post and connected to the links whereby operation of the motor powers movement of the links along the radial direction.

7. The device for placement of a ring onto an interior surface of a tire as in claim 1, further comprising a ring support plate movable along the central axis relative to the telescoping arms.

8. A device for placement of a ring onto an interior surface of a tire, the device defining a central axis, the device comprising:

a plurality of holders arranged around the central axis and configured for selectively holding and releasing the ring, each holder comprising a contact surface defining a plurality of slots and a plurality of pins configured to selectively extend and retract through the slots in order to engage and disengage the ring;

a plurality of telescoping arm assemblies arranged around the central axis, each arm assembly supporting at least one of the holders, each arm assembly configured for selectively extending and retracting the holder along a radial direction that is orthogonal to the central axis;

each telescoping arm assembly comprising a post and a plurality of links connected between at least one holder and the post, the links configured for pivoting relative to the post so as to extend and retract the at least one holder along the radial direction;

a positioning plate rotatable about the central axis, the positioning plate comprising a plurality of guides that spiral outwardly along the radial direction from the central axis, each guide in receipt of at least one telescoping arm assembly, each guide configured so that rotation of the positioning plate about the central axis causes the telescoping arm assemblies to move along the guides and outwardly or inwardly along the radial direction depending upon the direction of rotation of the positioning plate; and a plurality of rollers, each roller attached to at least one of the telescoping arm assemblies and configured to track along one of the guides as the positioning plate is rotated about the central axis.

9. A device for placement of a ring onto an interior surface of a tire, the device defining a central axis, the device comprising:

a plurality of holders arranged around the central axis and configured for selectively holding and releasing the ring;

a plurality of telescoping arm assemblies arranged around the central axis, each arm assembly supporting at least one of the holders, each arm assembly configured for selectively extending and retracting the holder along a radial direction that is orthogonal to the central axis;

each telescoping arm assembly comprising a post and a plurality of links connected between at least one holder and the post, the links configured for pivoting relative to the post so as to extend and retract the at least one holder along the radial direction;

a positioning plate rotatable about the central axis, the positioning plate comprising a plurality of guides that spiral outwardly along the radial direction from the central axis, each guide in receipt of at least one telescoping arm assembly, each guide configured so that rotation of the positioning plate about the central axis causes the telescoping arm assemblies to move along the guides and outwardly or inwardly along the radial direction depending upon the direction of rotation of the positioning plate; and wherein each post extends vertically upward from the positioning plate.

* * * * *